US012288944B2

(12) United States Patent
Parkin

(10) Patent No.: US 12,288,944 B2
(45) Date of Patent: Apr. 29, 2025

(54) MAGNETIC CONNECTOR FOR PORTABLE ELECTRONIC DEVICE

(71) Applicant: Norman Frederick Parkin, Centurion (ZA)

(72) Inventor: Norman Frederick Parkin, Centurion (ZA)

( * ) Notice: Subject to any disclaimer, the term of this patent is extended or adjusted under 35 U.S.C. 154(b) by 391 days.

(21) Appl. No.: 17/601,651

(22) PCT Filed: Apr. 9, 2020

(86) PCT No.: PCT/IB2020/053381
§ 371 (c)(1),
(2) Date: Oct. 5, 2021

(87) PCT Pub. No.: WO2020/208563
PCT Pub. Date: Oct. 15, 2020

(65) Prior Publication Data

US 2022/0094106 A1 Mar. 24, 2022

(30) Foreign Application Priority Data

Apr. 9, 2019 (ZA) ................................ 2019/02206

(51) Int. Cl.
*H01R 13/62* (2006.01)
*H01R 13/24* (2006.01)
(Continued)

(52) U.S. Cl.
CPC ..... *H01R 13/6205* (2013.01); *H01R 13/2471* (2013.01); *H01R 13/502* (2013.01); *H01R 13/631* (2013.01)

(58) Field of Classification Search
CPC ............ H01R 13/6205; H01R 13/2471; H01R 13/502; H01R 13/631
See application file for complete search history.

(56) References Cited

U.S. PATENT DOCUMENTS 7,351,066 B2 * 4/2008 DiFonzo .............. H01R 13/641 439/39
8,608,502 B2 * 12/2013 Witter .................... H01R 24/38 439/38

(Continued)

FOREIGN PATENT DOCUMENTS

CN 207611920 U 7/2018
EP 2207241 A2 7/2010

(Continued)

OTHER PUBLICATIONS

International Search Report and Written Opinion for Application No. PCT/IB2020/053381 dated Nov. 18, 2020, 9 pages.

(Continued)

*Primary Examiner* — Renee S Luebke
*Assistant Examiner* — Paul D Baillargeon
(74) *Attorney, Agent, or Firm* — Baker Donelson; Carl M. Davis, II

(57) ABSTRACT

A connector for electrically connecting a portable electronic device to an accessory is provided. The connector comprises a first part (1) which operatively cooperates with a second part. The first part (1) has a first guide formation (9) and a first electrical contact (5) having a common center. The first guide formation (9) guides connection and rotation of the electrical contact (5) with and relative to a second electrical contact of a second part. The first electrical contact (5) includes at least two contact pads (17) arranged as concentric annuluses or annular arcs and sized and spaced so as to engage respective contact points of a second electrical contact of a second part. The first part (1) includes ferromagnetic elements (13) uniformly spaced about the common center at an equal radial distance therefrom. The ferromagnetic elements (13) are provided for attraction of or by a (Continued)

corresponding second set of ferromagnetic elements of a second part of the connector.

14 Claims, 3 Drawing Sheets

(51) Int. Cl.
*H01R 13/502* (2006.01)
*H01R 13/631* (2006.01)

(56) References Cited

U.S. PATENT DOCUMENTS

| | | | | |
|---|---|---|---|---|
| 9,088,097 | B2 * | 7/2015 | Kim | H01R 24/38 |
| 11,213,074 | B2 * | 1/2022 | Antonopoulos | H02J 7/0045 |
| 2016/0013582 | A1 * | 1/2016 | Byrne | H01R 13/2421 439/39 |

FOREIGN PATENT DOCUMENTS

| | | | |
|---|---|---|---|
| EP | 2533374 | A1 | 12/2012 |
| WO | 2007090069 | A2 | 8/2007 |

OTHER PUBLICATIONS

IP Australia Patent Office, Examination Report No. 1, AU 2020270554 (Oct. 31, 2024).

* cited by examiner

MAGNETIC CONNECTOR FOR PORTABLE ELECTRONIC DEVICE

CROSS-REFERENCE TO RELATED APPLICATIONS

This application claims priority from South African patent application number 2019/02206 filed on 9 Apr. 2019, which is incorporated by reference herein.

FIELD OF THE INVENTION

The invention relates to a connector for electrically connecting a portable electronic device to an accessory.

BACKGROUND TO THE INVENTION

Mobile phones or "smart phones" have wide ranging and seemingly ever-increasing functionality. This wide-ranging functionality makes such devices capable for use in a broad range of applications. For example, even a modest smart phone with the appropriate software applications can perform the functionality of any one or more of: a navigation system, an entertainment system, a telephone, an email client, a telemetric data logging unit, a location tracking unit, a customer interface (e.g. for receiving customer information and even a customer signature), a barcode scanner and the like.

One benefit of this wide-ranging functionality is that a single smart phone can be used during multiple stages of a business process. For example, in the case of parcel delivery, a driver of a delivery vehicle can use the smart phone to: scan parcels in as she loads them into the vehicle; navigate to the next address for delivery; scan the parcel out as it is delivered; receive a signature and other customer data of the individual receiving the parcel; call a contact centre or a customer to arrange delivery; track the driver's distance travelled, driving style, locations visited; and the like.

While smart phones are capable for use in such applications, their form factor is of course static and not conducive to or suitable for many of the tasks which the smart phone can be used to perform. For example, it might be preferable to have the smart phone mounted on a dashboard of the delivery vehicle while being used for navigation, while some form of handle may make it easier to scan barcodes of the parcels being loaded or unloaded from the vehicle.

There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention, there is provided a connector comprising a first part which operatively cooperates with a second part, the first part of the connector comprising a first guide formation and a first electrical contact having a common centre, the first guide formation being configured to guide connection and rotation of the first electrical contact with and relative to a second electrical contact of a second part, the first electrical contact including at least two contact pads arranged as concentric annuluses or annular arcs and being sized and spaced so as to engage respective contact points of a second electrical contact of a second part, the first part further including a first set of ferromagnetic elements including a plurality of ferromagnetic elements uniformly spaced about the common centre at an equal radial distance therefrom, the plurality of ferromagnetic elements being provided for attraction of or by a corresponding second set of ferromagnetic elements of a second part of the connector.

Further features provide for each contact pad to be electrically insulated from adjacent contact pads; and for the contact pads to be arranged as concentric annuluses.

A still further feature provides for the first guide formation to be in the form of a cylindrically shaped formation which is concentric with the common centre, for the cylindrically shaped formation to be arranged to axially receive or be axially received by a second guide formation, and for the first guide formation to be in the form of a groove or protrusion which encircles the first electrical contact and which cooperates in use with a corresponding, second guide formation of a second part of the connector.

Yet further features provide for the first set of ferromagnetic elements to include at least three ferromagnetic elements, for the at least three ferromagnetic elements to be arranged so as to define equal sectors centred on the common centre; and for the first set of ferromagnetic elements to include four ferromagnetic elements which are arranged so as define 90-degree sectors.

Still further features provide for the first part to include a body which supports the first electrical contact and the first set of ferromagnetic elements, the body providing access to an underside of the first electrical contact for connection of wires to respective contact pads thereof; for the body to include depressions in which the first set of ferromagnetic elements are supported, for the depressions to have a depth selected to be less than or equal to a corresponding height of each of the plurality of ferromagnetic elements; for the body to include a central, circular aperture centred on the common centre, for the first electrical contact to be supported in the aperture and for the first guide formation to be defined by a space extending between a periphery of the aperture and a periphery of the first electrical contact; and, for a face of the body on which the electrical contact and the first set of ferromagnetic elements are supported to be rectangular in shape.

In accordance with a further aspect of the invention, there is provided a connector comprising a second part which operatively cooperates with a first part, the second part comprising a second guide formation and a second electrical contact, the second guide formation being configured to guide connection and rotation of the second electrical contact with and relative to a first electrical contact of a first part, the second electrical contact including at least two pins arranged operatively to engage respective contact points of a first electrical contact of a first part, the second part further including a second set of ferromagnetic elements including a plurality of ferromagnetic elements uniformly spaced about a centre which is common to a centre of the second guide formation, each of the plurality of ferromagnetic elements being located at an equal radial distance from the common centre and being provided for attraction of or by a corresponding first set of ferromagnetic elements of a first part of the connector.

Further features provide for each of the pins to be compressible along its axis and against a bias; for the pins of the second electrical contact to be arranged linearly to define a line of pins, and for the line of pins to be centred on the common centre; for pairs of pins to be electrically coupled, and for each pair of pins to include a pin located on either side of the common centre and equidistant therefrom.

A still further feature provides for the second guide formation to be in the form of a cylindrically shaped formation which is concentric with the common centre, for the cylindrically shaped formation to be arranged to axially receive or be axially received by a first guide formation a first part of the connector, and for the second guide formation to be in the form of a groove or protrusion which encircles the second electrical contact and which cooperates in use with a corresponding first guide formation of a first part of the connector.

Yet further features provide for the second set of ferromagnetic elements to include at least three ferromagnetic elements, for the at least three ferromagnetic elements to be arranged so as to define equal sectors centred on the common centre; and for the second set of ferromagnetic elements to include four ferromagnetic elements which are arranged to define 90-degree sectors.

Further features provide for the second part to be integrated with a portable electronic device enclosure having a wall which supports the second electrical contact and second set of ferromagnetic elements, for the pins of the second electrical contact to protrude from an exterior surface of the wall; for the wall to include depressions in which the second set of ferromagnetic elements are supported, and for the depressions to have a depth selected to be less than or equal to a corresponding height of each of the plurality of ferromagnetic elements.

In accordance with a further aspect of the invention, there is provided a connector comprising the first part as defined above and the second part as defined above.

An embodiment of the invention will now be described, by way of example only, with reference to the accompanying drawings.

DETAILED DESCRIPTION WITH REFERENCE TO THE DRAWINGS

Figure 1:
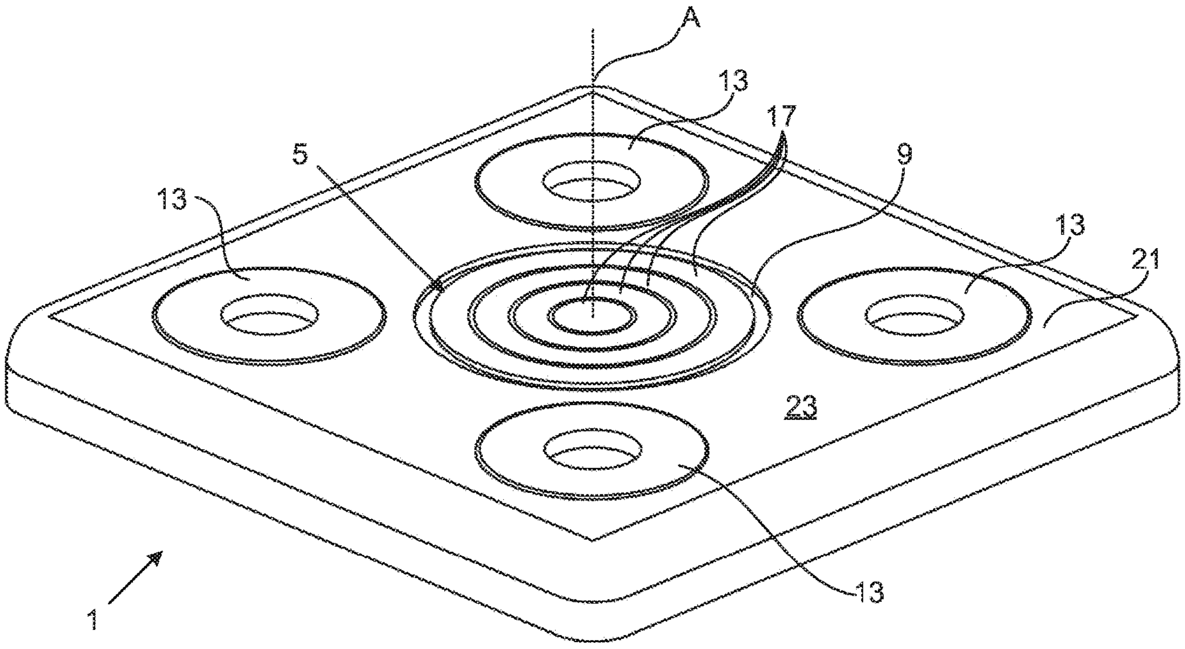
FIG. 1 is a three-dimensional view which illustrates a first part of a connector according to aspects of the present disclosure.

Aspects of the present disclosure provide a connector for electrically connecting a portable electronic device, such as a mobile phone or smart phone, to an accessory. A variety of accessories are anticipated, including for example a vehicle-mounted cradle or tray; a hand grip or "trigger unit"; an arm or wrist mount; a handle bar mount; a vest mount, and the like. The electrical connection between the portable electronic device and the relevant connector may enable electrical and/or data communication of components of the portable electronic device with components of the accessory.

The connector may include two parts, one being provided on the relevant accessory and the other being integrally formed with an enclosure or housing which encloses or houses the portable electronic device. The connector is configured for simple (e.g. single-handed) connection and disconnection between the portable electronic device and relevant accessory. In some implementations, the connector may be configured to enable rotation of the portable electronic device relative to the accessory without losing or breaking the electrical connection between the portable electronic device and the accessory.

The Figures illustrate one exemplary embodiment of a connector of the invention. The connector includes a first part (1) and a second part (3).

Each part (1, 3) includes an electrical contact (5, 7) via which the respective parts electrically connect a portable electronic device to an accessory. Guide formations (9, 11) are further provided to guide connection and rotation of the electrical contacts with and relative to each other. The guide formations (9, 11) and electrical contacts (5, 7) of the respective parts (1, 3) may have a common centre (or may be arranged about a central axis (A, B) defining a common centre). Each of the first and second part may include a set of ferromagnetic elements including a plurality of ferromagnetic elements (13, 15) uniformly spaced about the common centre of each part and at an equal radial distance from that common centre. The sets of ferromagnetic elements may be provided to attract each other and hence to attract and hold together the respective parts of the connector.

The term "ferromagnetic element" as used herein shall be construed to mean any element made from a material which can be magnetized by an external magnetic field and remain magnetized (i.e. a "permanent magnet") or from a material which can be noticeably attracted to a permanent (or electromagnetic) magnet (such as elements made from iron, cobalt, nickel, their alloys and the like). Each ferromagnetic element may therefore be a permanent magnet or an element manufactured from a material which can be attracted by a permanent magnet.

The electrical contact, guide formation and ferromagnetic elements of each part of the connector may be arranged on respective faces of each of the parts of the connector. The guide formations (9, 11) and/or ferromagnetic elements (13, 15) may provide a means of alignment for the electrical contacts (5, 7) as faces of each part of the connector are brought towards each other.

The electrical contact (5) of the first part (1) includes at least two contact pads (17). The contact pads (17) may be arranged as concentric annular arcs or annuluses. The electrical contact (5) of the first part may for example include between two and twenty contact pads. In some implementations, many more contact pads may be provided. Each contact pad (17) may be electrically insulated from adjacent contact pads. In the illustrated embodiment, the contact pads (17) are arranged as concentric annuluses.

The electrical contact (7) of the second part (3) includes at least two pins arranged to engage respective contact pads of the electrical contact (5) of the first part (1). The pins may be arranged linearly to define a line of pins. The line of pins may be centred on the common centre. In other words, a centre point in the line of pins may be concentric with the common centre. In some implementations, pairs of pins may be electrically coupled. Each pair of pins may for example include a pin located on either side of the common centre and equidistant therefrom, so that pins of a pair locate on a circumference of a hypothetical circle, with the circle of each pair of pins being concentric. Pairs of pins which contact the same contact pad may thus be electrically coupled. Each electrically coupled pair of pins may for example include those pins in the line of pins which are located either side of the common centre at an equal distance therefrom. In other implementations, a single pin for each corresponding contact pad may be provided. The electrical contact (7) of the second part (3) may include between two and twenty pins, although more may be provided.

The pins may be arranged so as to protrude from the face of the second part (3) of the connector. In some implementations, a portion of the face of the second part which locates within the guide formation (11) may be depressed relative that portion of the face which locates outside of the guide formation. In other words, the pins may locate in a recess of the face of the second part.

The depth of this recess or depression may be selected in conjunction with a height of the protrusion providing the guide formation of the second part such that the outer edge of the guide formation extends further from the encircled portion of the face than do the pins.

Each pin may be compressible along its axis or length against a bias. In some implementations, the length of each pin while fully extended (i.e. in its uncompressed state) may be selected so as to be greater than the distance extending between the face of the second part from which the pins extend and the electrical contact of the first part when the first and second parts are connected to each other. This distance may be defined by the setting of the ferromagnetic elements relative to the respective faces of the first and second parts. By making the length of the pins greater than this distance, the pins will be compressed against their bias when the first part is connected to the second part. This configuration may result in the pins being urged against their respective contact pads in operation by virtue of the bias, which may assist in maintaining the electrical connection between the respective electrical contacts, especially during rotation and/or other movement of the parts relative to each other. The pins may be provided by so-called pogo pins.

The electrical contacts may be configured to provide one or more of data communication (including e.g. audio data), electrical power, and user interface inputs (such as trigger inputs in the case of an accessory in the form of a hand grip) and the like.

The guide formations (9, 11) may be cooperating cylindrically shaped formations which are concentric with the common centre of each of the first and second parts (1,3). The cooperating cylindrical shape of the guide formations may be selected to facilitate rotation of the first part relative to the second part (e.g. with the cylindrically shaped formation of the first part axially receiving the cylindrically shaped formation of the second part, or vice versa).

For example, the guide formation (9) of the first part may be in the form of either a groove or protrusion which cooperates in use with the corresponding guide formation (11) of the second part (3) of the connector. It follows that the guide formation (11) of the second part (3) may be the other of a protrusion or groove. In some embodiments, the groove or protrusion of the first part may encircle the electrical contact (5) and the protrusion or groove of the second part may encircle the electrical contact (7) of the second part (3). In other embodiments, the groove and protrusion formations may be interposed between contact points of the electrical contacts. In other embodiments, the groove and protrusion formations may locate centrally, for example on the common centre, with the electrical contacts arranged around these formations.

In the illustrated embodiment, the guide formation (9) of the first part is in the form of a groove encircling the contact pads and the guide formation (11) of the second part is the form of a protrusion which encircles the pins. It should be appreciated that the guide formations (9, 11) are shaped and dimensioned so as to cooperate with each other, e.g. the one receiving the other, so as to guide connection and rotation of the respective parts and relative to each other.

The guide formations may guide rotation in that they direct the motion and/or positioning of the electrical contacts relative to each other. The circular protrusion or ring encircling the pins of the electrical contact of the second part may protect the pins from any shorting on a conductive surface. Using a circular guide formation may enable 360-degree rotation of the first part relative to the second part. It should be appreciated that electrical and/or data connection between the first and second parts may be uninterrupted during rotation of the first part relative to the second part.

In the illustrated embodiment, each of the parts (1, 3) includes four ferromagnetic elements (13, 15), although in other implementations another number of ferromagnetic elements may be provided (such as 2, 3, 5, 6, 7, 8, etc.). The ferromagnetic elements (13, 15) of each part (1, 3) are arranged so as to define equal sectors centred on the common centre. Where four ferromagnetic elements are used, 90-degree sectors are defined. Of course, if only two ferromagnetic elements are used, then 180-degree sectors will be defined while if three ferromagnetic elements are used then 120-degree sectors will be defined. It should be appreciated that the locations of the ferromagnetic elements on the first part will correspond to the locations of the ferromagnetic elements on the second part, such that each ferromagnetic element on the first part has a corresponding ferromagnetic element on the second part which it can attract or by which it can be attracted. The ferromagnetic elements on the first part may be permanently magnetised or capable of being temporarily magnetised (i.e. capable of being attracted by a permanent magnet). The ferromagnetic elements on the second part may be the other of capable of being magnetised or may be permanent magnets. In some implementations, the ferromagnetic elements (13, 15) of each of the first and second parts may be provided by permanent magnets. The ferromagnetic elements (13, 15) may be selected so as to operatively hold the two parts together to allow adhesion of one part of the connector to the other.

Orienting the ferromagnetic elements uniformly around the common centres of each of the parts allows a sector-wise rotation of the first part relative to the second part. In other words, the first part can be rotated relative to the second part in, in the illustrated embodiment, 90-degree steps. This sector-wise rotation may be guided by the cooperating guide formations provided on each part, while the configuration of the electrical contacts, in the form of pins and concentric annular contact pads, ensures continual electrical connection of the two parts during this rotation. The ferromagnetic elements may effect a "snapping" effect whereby the first part is "snapped" into one of the four positions defined by the positioning of the ferromagnetic elements.

In some implementations, ferromagnetic elements may be selected such that the parts need to be twisted relative to each other before they can be separated. For example, strong permanent magnets may be used to make it difficult to move the parts away from each other with the ferromagnetic elements aligned. The circular guide formations (9, 11) may allow the twist movement to be executed easily, and may facilitate maintaining electrical contact between the pins and their corresponding contact pads (i.e. in their correct positions to prevent a short circuit).

Using a plurality of ferromagnetic elements which are uniformly spaced about the common centre at an equal radial distance therefrom, as described herein, may result in benefits including: rotation of a communication device relative to a connected accessory, through a series of predefined orientations, may be enabled; and, very strong magnets can be used to avoid accidental disconnection, as the arrangement of ferromagnetic elements and guide formations described herein allows a device to be twisted relative to a connected accessory to move the ferromagnetic elements of the respective parts of the connector out of alignment with each other to significantly reduce the attractive force between the two sets of ferromagnetic elements, from where the device and accessory may be pulled free from each other in the presence of a weaker magnetic force of attraction (because of the misalignment).

In some implementations, the ferromagnetic elements may be configured to provide data and/or electrical communication between the portable electronic device and relevant accessory. For example, the ferromagnetic elements may include conductive components which conduct electricity and which can be used for the transmission of electrical power and/or data. The ferromagnetic elements may thus act as connection points which can carry electricity or communications from accessories such as a vehicle bay or tray, handle bar mount, arm band, etc. to the relevant portable electronic device.

The first part (1) of the connector may include a body (21) which supports the electrical contact (5) and ferromagnetic elements (13). The body may provide access to an underside of the electrical contact for connection of wires (not shown) to respective contact pads (17) thereof.

The body may include depressions in which the ferromagnetic elements (13) are supported. The depressions may have a depth selected to be less than or equal to a corresponding height of each of the ferromagnetic elements. The ferromagnetic elements may thus be flush with or just proud of a face (23) of the body on which they are supported. The face (23) of the body may be rectangular or square in shape. In some implementations, a periphery of the body may be beveled.

The body (21) may include a central, circular aperture centred on the common centre. The first electrical contact (5) may be supported in the aperture. In the illustrated embodiment, the guide formation (9) of the first part is in the form of a groove defined by a space extending between a periphery of the aperture and a periphery of the electrical contact. In other words, a diameter of the aperture may be larger than an outermost diameter of the first electrical contact such that a gap is defined between them when they are arranged concentrically.

Figure 2:
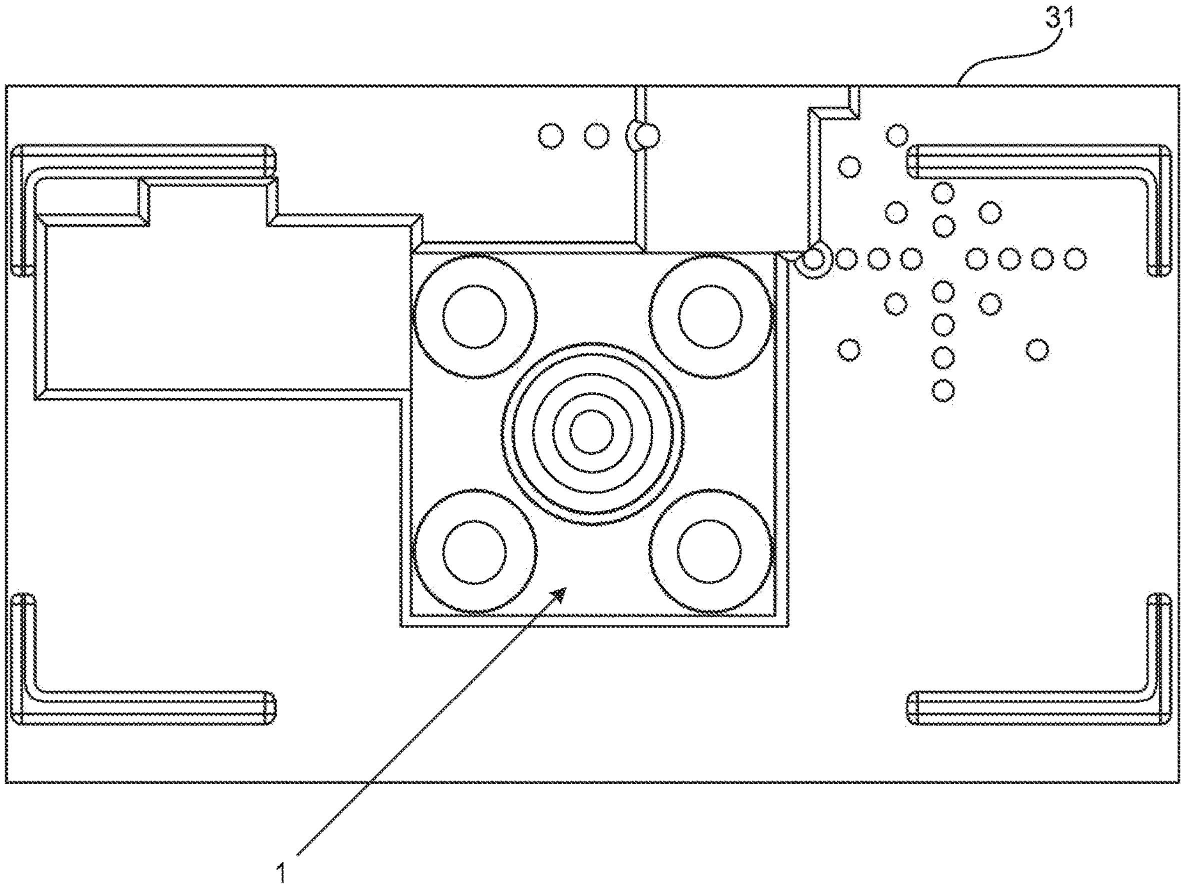
FIG. 2 is a front view of a vehicle tray including the first part of the connector illustrated in FIG. 1.
Figure 3:
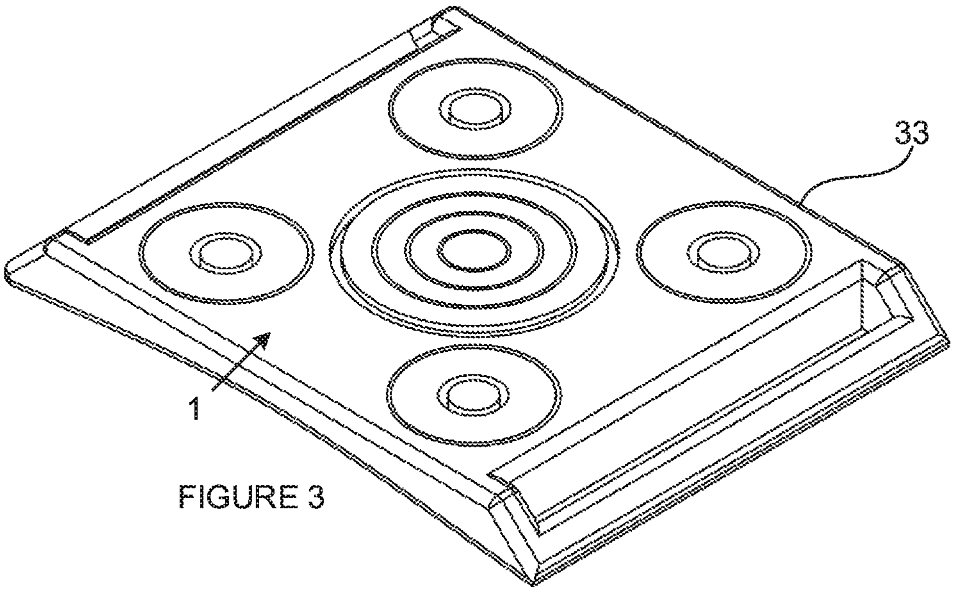
FIG. 3 is a three-dimensional view of an arm band including the first part of the connector illustrated in FIG. 1.
Figure 4:
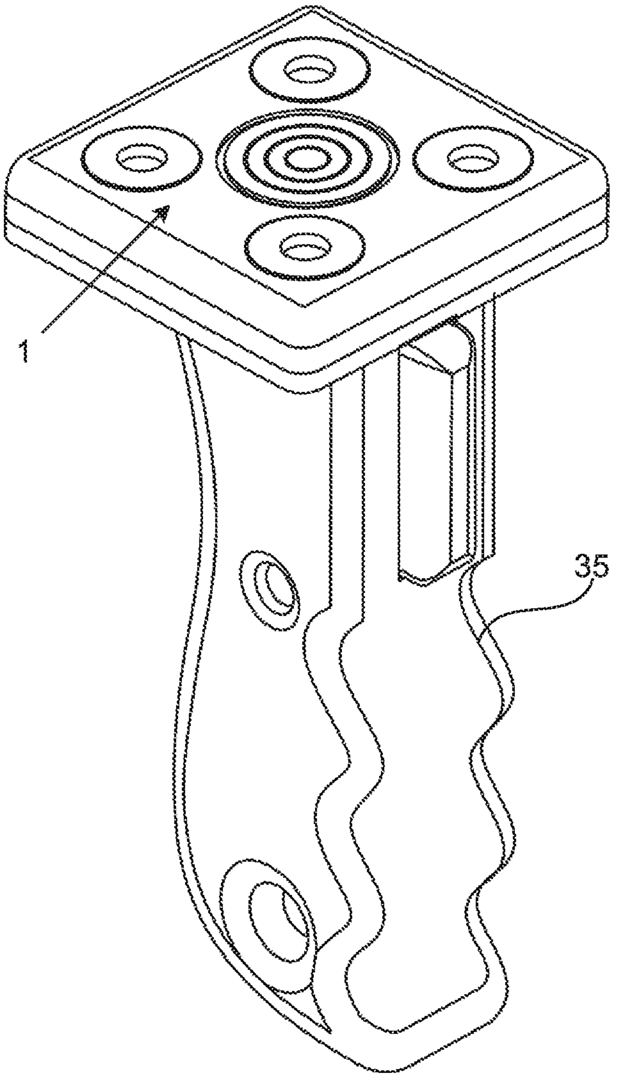
FIG. 4 is a three-dimensional view of a hand grip including the first part of the connector illustrated in FIG. 1.
Figure 5:
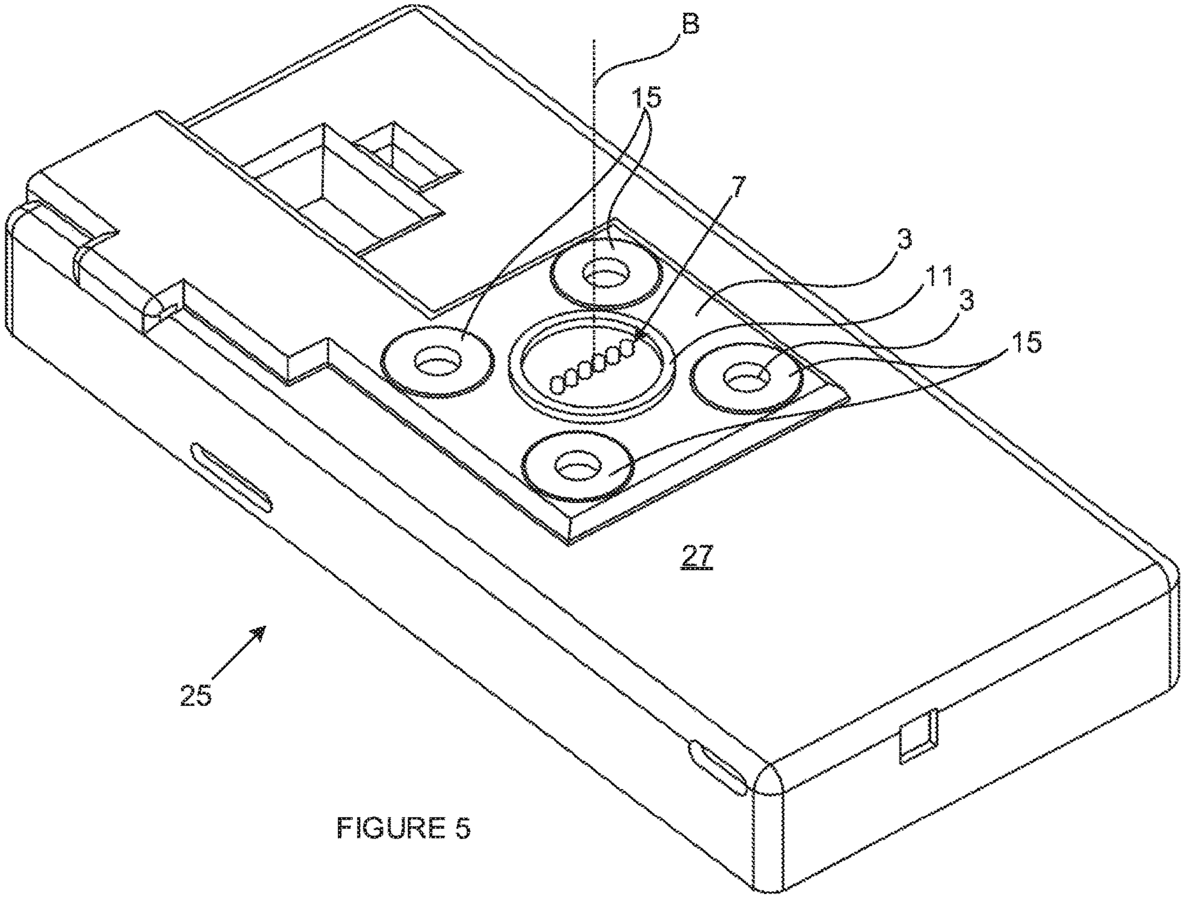
FIG. 5 is a three-dimensional view of a portable electronic device enclosure from an underside thereof, which enclosure includes a second part of the connector.
Figure 6:
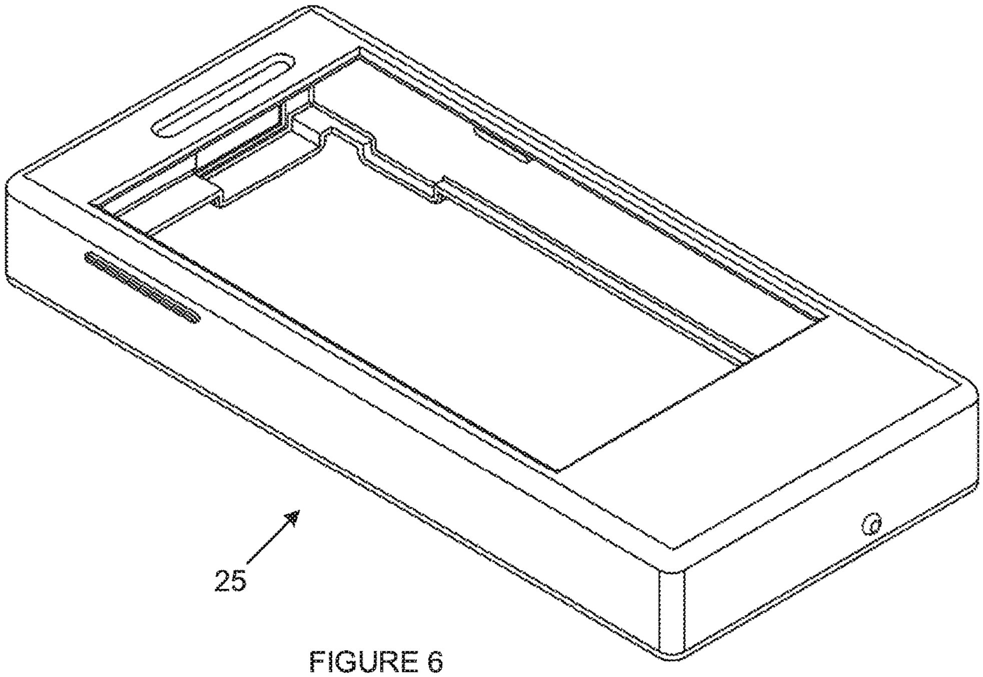
FIG. 6 is a three-dimensional view of the portable electronic device enclosure from an upper side thereof.

The first part (1) of the connector may be mounted on or provided by a variety of accessories, for example a cradle (31) for fitment in a motor vehicle, as illustrated in FIG. 2; an arm or wrist strap (33) as illustrated in FIG. 3 (with the actual strap being omitted from the Figure); or, a hand grip (35) which may include a trigger mechanism, as illustrated in FIG. 4, usable for example in scanning packages. In some implementations, a non-electrical configuration of the first part may be provided, which configuration may omit the electrical contact. Such a configuration may for example be provided on an arm or wrist strap where electrical connection is not required.

In the illustrated embodiment, the second part (3) is integrated with a portable electronic device enclosure (25) having a wall (27) which supports the electrical contact (7) and ferromagnetic elements (15). The pins of the electrical contact protrude from the wall generally perpendicularly to an outer or exterior surface thereof. In some implementations, the wall may include an escarpment or step defining a raised portion on which the electrical contact (7) and ferromagnetic elements (15) locate.

The wall (or a raised portion thereof) may include depressions in which the ferromagnetic elements (15) are supported. The depressions may have a depth selected to be less than or equal to a corresponding height of the ferromagnetic elements.

Wires may connect to ends of the pins embedded in the wall and may terminate in a suitable connector configured for connection to a port or socket of a portable electronic device.

In use, a portable electronic device, such as a smart phone, tablet computer, etc. may be located in the portable electronic device enclosure, with the connector connected to the port or socket, and one or more accessories may be provided. A user of the portable electronic device may then bring the portable electronic device enclosure into proximity of the accessory with faces of the parts of the connector facing each other. An attractive magnetic force imparted by the ferromagnetic elements of the respective parts of the connector may attract the parts of the connector towards one another. This attractive force may assist in aligning the ferromagnetic elements of the first part with corresponding ferromagnetic elements of the second part which in turn may align the guide formations of the respective parts with each other. The user, under the influence of the attractive force imparted by the ferromagnetic elements, may continue to guide the second part relative to the first part until guide formations of the respective parts receive and cooperate with each other to then bring the electrical contacts of each part into contact with each other. With the electrical contacts in physical contact with each other, electrical and/or data communication between the portable electronic device and circuitry of or connected to the accessory may be enabled.

At some stage, the user may need to rotate the portable electronic device relative to the accessory to which it is connected. To do so, the user may simply twist or rotate the portable electronic device relative to the accessory and against the magnetic force imparted by the ferromagnetic elements of the connector. The twisting or rotating may be in a plane which is perpendicular to the axis of the common centres of the parts. The required rotative force, being applied perpendicular to the direction of the force of attraction imparted by the ferromagnetic elements, may be much less than, for example an axial force required to separate the parts from each other. This rotation may angularly displace the ferromagnetic elements of the first part relative to the ferromagnetic elements of the second part to significantly diminish the magnetic force of attraction between the first and second part. Continued rotation of the portable electronic device, guided by the guide formations such that electrical connection between the electrical contacts is maintained, may bring the ferromagnetic elements of each part back into alignment, albeit with each ferromagnetic element of the first part being aligned with a different (or the next) ferromagnetic element of the second part. Once aligned, the magnetic force of attraction between the first and second part may be restored.

Should the user wish to disconnect the portable electronic device from the accessory, she may do so by urging the portable electronic device away from the accessory and against the magnetic force of attraction. Sufficient force applied by the user should see the first and second part being separated from each other. To ease the removal, however, the user may choose to first rotate the portable electronic device relative to the accessory to a degree sufficient to reduce or diminish the magnetic force of attraction and to then urge the portable electronic device away from the accessory (e.g. with the ferromagnetic elements of the first part locating in between ferromagnetic elements of the second part).

It should be appreciated that during rotation and other movement of the first part relative to the second part, the guide formations prevent any misalignment of the respective electrical contacts, so as to prevent short circuits or other undesired consequences.

The connector described herein may thus enable easy and convenient connection and disconnection of a portable electronic device to and from a variety of different accessories. This may make the form factor of such portable electronic devices adaptable to the various applications in which the device can be deployed.

The first and second parts of the connector may be sold separately. For example, the first part of the connector may be integrated with and sold together with one or more accessories while the second part of the connector may be integrated with and sold together with portable electronic device enclosures.

Aspects of the present disclosure provide a connector or interface which uses a combination of magnets, pogo pins and a ring for guidance. The connector may allow for magnetic and electrical connection of a portable electronic device to any number of accessories, for example including an arm band, car tray, handheld module and the like.

Aspects of the present disclosure embody an arrangement of ferromagnetic elements and guide formations which may cooperate to define a finite set of orientations of a device and connected accessory. The ferromagnetic elements facilitate locking-in of one of the orientations of the device relative to the accessory. The arrangement of ferromagnetic elements and guide formations described herein may further cooperate to provide, e.g. a 90 degree, step-wise rotation of a device relative to a connected accessory through each of the finite set of orientations. Aspects of the present disclosure may therefore enable single-handed connection, locking, orientation, unlocking, and disconnection of a device and compatible accessory.

It should be appreciated that the foregoing description has been provided by way of example only, and various modifications or alterations of the connector may be provided without departing from the scope of the invention as defined in the claims which follow. For example, although the foregoing description describes use of the connector with portable electronic device enclosures, it is anticipated that the second part of the connector may be integrated with portable electronic devices themselves, to obviate, to some extent, the need for the enclosure. In some cases, the first part of the connector may be integrated with the portable electronic device or enclosure while the second part of the connector is integrated with an accessory.

Throughout the specification and claims unless the contents requires otherwise the word ‘comprise’ or variations such as ‘comprises’ or ‘comprising’ will be understood to imply the inclusion of a stated integer or group of integers but not the exclusion of any other integer or group of integers.

The invention claimed is:

1. A connector comprising a first part which operatively cooperates with a second part, the first part of the connector comprising a first guide formation and a first electrical contact having a common centre, the first guide formation being configured to guide connection and rotation of the first electrical contact with and relative to a second electrical contact of a second part, the first electrical contact including at least two contact pads arranged as concentric annuluses or annular arcs and being sized and spaced so as to engage respective contact points of a second electrical contact of a second part, the first part being provided without a centrally locating magnet at the common centre and further including a first set of ferromagnetic elements including a plurality of ferromagnetic elements uniformly spaced about the common centre at an equal radial distance therefrom, the plurality of ferromagnetic elements being provided for attraction of or by a corresponding plurality of second ferromagnetic elements of a second set of ferromagnetic elements of a second part of the connector being provided without a centrally locating magnet at a second common centre thereof, wherein the first part includes a body which supports the first electrical contact and the first set of ferromagnetic elements, the body providing access to an underside of the first electrical contact for connection of wires to respective contact pads thereof, wherein the body includes a central, circular aperture centred on the common centre, wherein the first electrical contact is supported in the aperture, wherein the first guide formation is in the form of a cylindrically shaped formation defined by a space extending between a periphery of the aperture and a periphery of the first electrical contact and which is concentric with the common centre, wherein the cylindrically shaped formation is arranged to axially receive or be axially received by a second guide formation of a second part of the connector, wherein the first set of ferromagnetic elements includes at least three ferromagnetic elements, wherein the at least three ferromagnetic elements are arranged so as to define equal sectors centred on the common centre, and wherein the arrangement of ferromagnetic elements and guide formations permit the first part to be twisted relative to a second part to move the ferromagnetic elements of the respective parts of the connector out of alignment with each other.

2. The connector as claimed in claim 1, wherein each contact pad is electrically insulated from adjacent contact pads.

3. The connector as claimed in claim 1, wherein the contact pads are arranged as concentric annuluses.

4. The connector as claimed in claim 1, wherein the plurality of ferromagnetic elements includes four ferromagnetic elements which are arranged so as to define 90-degree sectors.

5. The connector as claimed in claim 1, wherein the body includes depressions in which the first set of ferromagnetic elements are supported, wherein the depressions have a depth selected to be less than or equal to a corresponding height of each of the plurality of ferromagnetic elements.

6. The connector as claimed in claim 1, further comprising a second part which operatively cooperates with the first part, the second part comprising a second guide formation and a second electrical contact having a second common centre, the second guide formation being configured to guide connection and rotation of the second electrical contact with and relative to the first electrical contact of the first part, the second electrical contact including at least two pins arranged operatively to engage respective contact points of the first electrical contact of the first part, the second part including a second set of ferromagnetic elements including a plurality of second ferromagnetic elements uniformly spaced about the second common centre of the second guide formation, each of the plurality of second ferromagnetic elements being located at an equal radial distance from the second common centre and being provided for attraction of or by the corresponding plurality of ferromagnetic elements of the first set of ferromagnetic elements of the first part of the connector, wherein the second guide formation is in the form of a cylindrically shaped formation which is concentric with the second common centre, wherein the cylindrically shaped formation is arranged to axially receive or be axially received by a first guide formation of the first part of the connector, wherein the plurality of second ferromagnetic elements includes at least three ferromagnetic elements, and wherein the at least three ferromagnetic elements are arranged so as to define equal sectors centred on the second common centre.

7. The connector as claimed in claim 6, wherein each of the at least two pins of the second electrical contact is compressible along its axis and against a bias.

8. The connector as claimed in claim 7, wherein the at least two pins of the second electrical contact are arranged linearly to define a line of pins, and wherein the line of pins is centred on the second common centre.

9. The connector as claimed in claim 6, wherein pairs of the at least two pins are electrically coupled, and wherein each pair includes a pin located on either side of the second common centre and equidistant therefrom.

10. The connector as claimed in claim 6, wherein the second guide formation is in the form of a groove or protrusion which encircles the second electrical contact and which cooperates in use with the corresponding first guide formation of the first part of the connector.

11. The connector as claimed in claim 6, wherein the plurality of second ferromagnetic elements includes four ferromagnetic elements which are arranged to define 90-degree sectors.

12. The connector as claimed in claim 6, wherein the second part is integrated with a portable electronic device enclosure having a wall which supports the second electrical contact and the second set of ferromagnetic elements, wherein the pins of the second electrical contact protrude from an exterior surface of the wall, wherein the wall includes depressions in which the second set of ferromagnetic elements are supported, wherein the depressions have a depth selected to be less than or equal to a corresponding height of each of the plurality of second ferromagnetic elements.

13. The connector as claimed in claim 1, wherein the ferromagnetic elements and the second ferromagnetic elements are selected such that the first part and the second part are separable by twisting the first part and the second part relative to each other.

14. A connector comprising a first part and a second part, wherein the first part operatively cooperates with the second part, the first part of the connector including a first guide formation and a first electrical contact having a common centre, the first guide formation being configured to guide connection and rotation of the first electrical contact with and relative to a second electrical contact of the second part, the first electrical contact including at least two contact pads arranged as concentric annuluses or annular arcs and being sized and spaced so as to engage respective contact points of the second electrical contact of the second part, the first part being provided without a centrally locating magnet at the common centre and further including a first set of ferromagnetic elements including a plurality of ferromagnetic elements uniformly spaced about the common centre at an equal radial distance therefrom, the plurality of ferromagnetic elements being provided for attraction of or by a corresponding second set of ferromagnetic elements of the second part of the connector, the first part of the connector further including a body which supports the first electrical contact and the first set of ferromagnetic elements, the body providing access to an underside of the first electrical contact for connection of wires to respective contact pads thereof, wherein the body includes a central, circular aperture centred on the common centre, and wherein the first electrical contact is supported in the aperture;

and the second part including a second guide formation and the second electrical contact having a second common centre, the second guide formation being configured to guide connection and rotation of the second electrical contact with and relative to the first electrical contact of the first part, the second electrical contact including at least two pins arranged operatively to engage respective contact points of the first electrical contact of the first part, the second part being provided without a centrally locating magnet at the second common centre and further including the second set of ferromagnetic elements including a plurality of second ferromagnetic elements uniformly spaced about the second common centre, each of the plurality of second ferromagnetic elements being located at an equal radial distance from the second common centre and being provided for attraction of or by the corresponding plurality of ferromagnetic elements of the first set of ferromagnetic elements of the first part of the connector, wherein the first guide formation is in the form of a cylindrically shaped formation defined by a space extending between a periphery of the aperture and a periphery of the first electrical contact and which is concentric with the common centre, wherein the cylindrically shaped formation of the first part is arranged to axially receive or be axially received by a second guide formation of the second part of the connector, wherein the plurality of first ferromagnetic elements includes at least three ferromagnetic elements, wherein the at least three ferromagnetic elements of the first set are arranged so as to define equal sectors centred on the common centre, wherein the second guide formation is in the form of a cylindrically shaped formation which is concentric with the second common centre, wherein the cylindrically shaped formation of the second part is arranged to axially receive or be axially received by the first guide formation of the first part of the connector, wherein the plurality of second ferromagnetic elements includes at least three ferromagnetic elements, wherein the at least three ferromagnetic elements of the second set are arranged so as to define equal sectors centred on the second common centre, and wherein the arrangement of ferromagnetic elements and guide formations permit the first part to be twisted relative to the second part to move the ferromagnetic elements of the respective first and second parts of the connector out of alignment with each other.

* * * * *